United States Patent
Bourdrez et al.

(10) Patent No.: US 10,286,947 B2
(45) Date of Patent: May 14, 2019

(54) FILTERING METHOD FOR THE DETECTION OF THE TRANSITIONS OF A POWER STEERING SIGNAL

(71) Applicant: JTEKT EUROPE, Irigny (FR)

(72) Inventors: Sébastien Bourdrez, Yzeron (FR); Pascal Moulaire, La Tour de Salvagny (FR); Christophe Ravier, Saint Pierre de Chandieu (FR)

(73) Assignee: JTEKT EUROPE, Irigny (FR)

( * ) Notice: Subject to any disclaimer, the term of this patent is extended or adjusted under 35 U.S.C. 154(b) by 102 days.

(21) Appl. No.: 15/123,812

(22) PCT Filed: Feb. 27, 2015

(86) PCT No.: PCT/FR2015/050471
§ 371 (c)(1),
(2) Date: Sep. 6, 2016

(87) PCT Pub. No.: WO2015/132508
PCT Pub. Date: Sep. 11, 2015

(65) Prior Publication Data
US 2017/0015349 A1    Jan. 19, 2017

(30) Foreign Application Priority Data
Mar. 3, 2014   (FR) ..................................... 14 51683

(51) Int. Cl.
*B62D 5/04*    (2006.01)
(52) U.S. Cl.
CPC ......... *B62D 5/0481* (2013.01); *B62D 5/0463* (2013.01)
(58) Field of Classification Search
CPC .. B62D 5/0481; B62D 5/0463; B62D 5/0469; B62D 5/0496

(Continued)

(56) References Cited

U.S. PATENT DOCUMENTS

| 6,502,025 B1 * | 12/2002 | Kempen | B62D 5/049 180/6.2 |
| 2007/0205040 A1 * | 9/2007 | Miyasaka | B62D 5/001 180/444 |

FOREIGN PATENT DOCUMENTS

| EP | 1645454 A1 | 4/2006 |
| EP | 2426030 A1 | 3/2012 |
| WO | 2012/035418 A1 | 3/2012 |

OTHER PUBLICATIONS

Jun. 16, 2015 International Search Report issued in International Patent Application No. PCT/FR2015/050471.
(Continued)

*Primary Examiner* — Nga X Nguyen
(74) *Attorney, Agent, or Firm* — Oliff PLC

(57) ABSTRACT

The invention concerns a method for detecting a transition (4') in a noisy signal, which involves submitting a noisy signal (δSignal) carrying an item of information used for managing the power steering, said method comprising a derivation sub-step (a1), which involves evaluating the time derivative of the noisy signal (δSignal/δt), following by a selective filtering sub-step (a2) which involves comparing said time derivative of the noisy signal (δSignal/δt) with a predefined variation threshold ($S_{pic}$) in order to detect the appearance of a derivative peak (7), greater than said variation threshold (Spic), evaluating the holding time (dpic) of said derivative peak, during which the time derivative of the noisy signal (δSignal/δt) is held above said variation threshold (Spic), and checking if said peak holding time (Spic) reaches or exceeds a predefined minimum time threshold (d0).

10 Claims, 1 Drawing Sheet

(58) Field of Classification Search
USPC .................. 701/23, 41–43; 180/400, 401
See application file for complete search history.

(56) References Cited

OTHER PUBLICATIONS

Jun. 16, 2015 Written Opinion issued in International Patent Application No. PCT/FR2015/050471.

* cited by examiner

FILTERING METHOD FOR THE DETECTION OF THE TRANSITIONS OF A POWER STEERING SIGNAL

The present invention concerns the general field of power steering management methods equipping vehicles, and in particular motor vehicles.

It concerns more particularly the processing of the signals, such as the measurement signal of the torque output by the steering assist motor, which are representative of operating parameters of the power steering, and the knowledge and the analysis of which are required for the good management of said power steering.

The signals which are used for the management of the power steering systems, and in particular the measurement signals collected from the sensors, such as for example the sensors that measure the motor torque or the torque exerted by the driver on the steering wheel, are likely to be affected by noise.

The noise deteriorates the quality of the signal by superposing random fluctuations to the useful information carried by the signal, wherein said random fluctuations may be rapid and of significant amplitude.

However, managing the power steering, and in particular choosing the assistance laws which may be applied at the considered instant, requires an exact knowledge of the behavior of the steering system and/or the behavior of the vehicle (for example the displacement direction of the vehicle, the steering direction of the steering wheel, etc.) at said considered instant.

Often, this knowledge lies on the perception of a state, or a change of state (transition), of a signal which is supposed to be representative of the operation of the power steering and the behavior of the vehicle.

This perception may arise in particular from the crossing, by one of the features of the considered signal (amplitude, frequency, etc.), of a predetermined threshold value.

It will be then understood that the random variations of the signal, induced by the noise, may sometimes distort this perception, for example by accidentally causing the threshold be exceeded, thus resulting in a «false positive».

The objects assigned to the invention then aim at overcoming the aforementioned drawbacks and to provide a new solution allowing processing in a rapid and reliable manner the noisy signals that are useful for the management of a power steering, in order to improve the detection of certain life situations of the vehicle and the steering system.

The objects assigned to the invention are reached by means of a power steering management method characterized in that it comprises a step (a) of detecting a transition in a noisy signal, during which a noisy signal, carrying an information used for the management of the power steering, is subjected to a derivation sub-step (a1), comprising evaluating the time derivative of the noisy signal, then to a selective filtering sub-step (a2) comprising comparing said time derivative of the noisy signal to a predetermined variation threshold in order to detect the appearance of a derivative peak, greater than said variation threshold, evaluating the holding duration of said derivative peak, during which the time derivative of the noisy signal is held above said threshold variation, and checking whether said peak holding duration reaches or exceeds a predetermined minimum duration threshold.

The objects assigned to the invention are also reached by means of a filter for detecting transitions within a noisy signal, said filter comprising a derivation module which is structured to collect the noisy signal and to evaluate the time derivative thereof, as well as a selective filtering module which is structured, on the one hand, for comparing said time derivative of the noisy signal to a predetermined variation threshold in order to detect the appearance of a derivative peak, greater than said variation threshold, and on the other hand for evaluating the holding duration of said peak, during which the time derivative of the noisy signal is held above said variation threshold, after having crossed said variation threshold, and for checking whether said peak holding duration reaches or exceeds a predetermined minimum duration threshold.

Advantageously, the invention allows distinguishing the transitions truly representative of an evolution of the signal and excluding false positives caused by the noise by means of applying two conditions, namely a first condition according to which the value of the time derivative of the signal must cross a variation threshold (slope threshold), which indicates the appearance of a transition phenomenon, and a second condition according to which this transition phenomenon, characterized by holding the value of the derivative above the transition threshold, must last enough to be attributable to an actual change of the value of the signal (and thus an actual change of the state of the steering system), and not to a mere local fluctuation caused by the noise.

Thus, the filter according to the invention enables identifying the derivative peaks of the signal and easily and quickly distinguishing between, on the one hand, the peaks which are representative of the state of the steering system or the behavior of the vehicle and which might then be retained for the management of said steering system, and on the other hand, the peaks caused by the noise, which will not be taken into consideration so as not to distort the steering management.

Advantageously, it will be noted that the processing provided by the invention may be applied directly to the raw noisy signal, as obtained, if any, at a sensor, without it being necessary to filter said signal beforehand in order to eliminate the background noise.

The invention then allows a processing of the signal that is both rapid and lowly sensitive to the instabilities, which improves the reactivity and the reliability of the management method, and consequently the safety of the steering system.

The direct exploitation of the noisy signals also allows avoiding intermediate filters, thus simplifying the implementation of the method and reduces the cost of this implementation.

Other objects, features and advantages of the invention will appear in further detail on reading the following description as well as the appended drawings, provided by purely illustrative and non-limiting way, in which:

FIG. 1 illustrates, in a time diagram, the evolution of a noisy signal, in this case a signal representative of the motor torque which is provided by the assist motor, wherein the invention enables detecting the transitions of said signal, for instance the transitions due to the successive steering reversals, shown in this same graph by a curve of evolution of the angular position of the steering wheel (or, equivalently, if taking into account the reduction ratio of the driving mechanism, by a curve of evolution of the angular position of the shaft of the assist motor).

The invention concerns a method for managing a power steering 1.

Said power steering 1 comprises at least one assist motor 2 intended for outputting an assistance force $C_{assist}$.

It is possible to indifferently consider any type of assist motor 2, and more particularly any type of bi-directional assist motor.

In particular, the invention may as well be applied to a rotary assist motor 2 intended for exerting a torque type assistance force $C_{assist}$, as to a linear assist motor 2 intended for exerting a traction or compression type assistance force $C_{assist}$.

Furthermore, said assist motor 2 may be for example hydraulic, or, preferably, electric (using an electric motor makes in particular easier implanting and implementing said motor, as well as generating and managing the useful signals).

In a particularly preferred manner, the assist motor 2 will be a rotary electric motor, for example of the «brushless» type.

Furthermore, the power steering 1 preferably comprises, in a known per se manner (but not shown), a steering wheel by which the driver of the vehicle can drive in rotation a steering column which engages, by means of a pinion, a rack slidingly mounted in a steering casing secured to the chassis of the vehicle.

The ends of the steering rack are preferably each connected to a yaw steerable stub axle, on which is mounted a steered (and preferably driving) wheel of the vehicle, so that the displacement of the rack in translation in the steering casing causes a change in the steering angle (i.e. yaw orientation) of said steered wheels.

The assist motor 2 may engage the steering column, for example through a wormwheel and worm reducer, or even directly engage the steering rack by a ball screw type driving mechanism or via a driving pinion separate from the pinion of the steering column (thus forming a steering mechanism called «dual pinion mechanism»).

Figure 4:
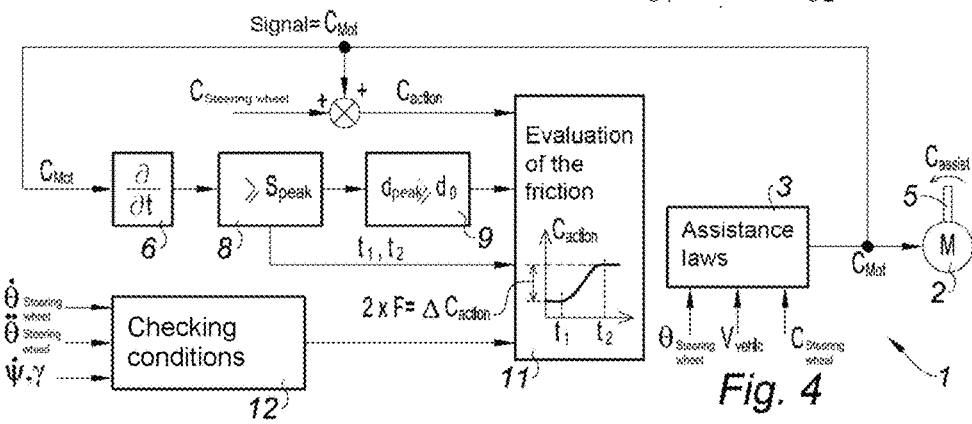
FIG. 4 illustrates, according to a block diagram, the operation of a method in accordance with the invention.

As illustrated in FIG. 4, the force setpoint (or, more preferably, the torque setpoint) $C_{Mot}$ which is applied to the assist motor 2 so that said motor assists the driver in maneuvering the steering 1 depends on predetermined assistance laws stored in a non-volatile memory of a calculator (herein an application module of assistance laws 3), wherein said assistance laws may adjust said force setpoint $C_{Mot}$ depending on various parameters such as the steering wheel torque $C_{steering\ wheel}$ exerted by the driver on the steering wheel, the (longitudinal) speed $V_{vehic}$ of the vehicle, the angular position $\theta_{steering\ wheel}$ of the steering wheel, etc.

According to the invention, the method comprises a step (a) of detecting a transition 4' in a noisy signal (denoted «Signal» in the figures and in the following).

During this step, one seeks to detect one (or more) transition(s) 4' of said noisy signal Signal, wherein said transitions correspond to the changes of state of the steering system, or, more generally, to the changes of the state of the dynamic behavior of the vehicle.

According to a preferred application of the method, to which reference will be made preferably in the following, for convenience of description, the transitions 4' to be detected correspond to steering reversals 4, that is to say, to changes of the direction in which the driver of the vehicle (voluntarily) actuates the steering wheel, these changes aiming at and resulting in switching from a steering situation to the left, in which the driver exerts a force which pulls the steering wheel to the left, to a steering situation to the right, in which the driver exerts a force which pulls the steering wheel to the right, or vice versa.

The step (a) for detecting transition(s) 4' will then preferably consist of a step for detecting steering reversal(s) 4.

Of course, the invention is not limited to this particular application, as the method may be perfectly applied to any noisy signal exploited by the power steering, or more generally by the vehicle.

Thus, the noisy signal Signal might in particular correspond to the speed of rotation or to the direction of rotation of the steering wheel, to the steering wheel torque $C_{steering\ wheel}$, to the speed or the direction of rotation of the shaft 5 of the assist motor 2, to the torque output by said assist motor, to the speed of the vehicle $V_{vehic}$, or to the yaw rate or to the acceleration of the vehicle, or any useful combination of these signals.

Figure 1:
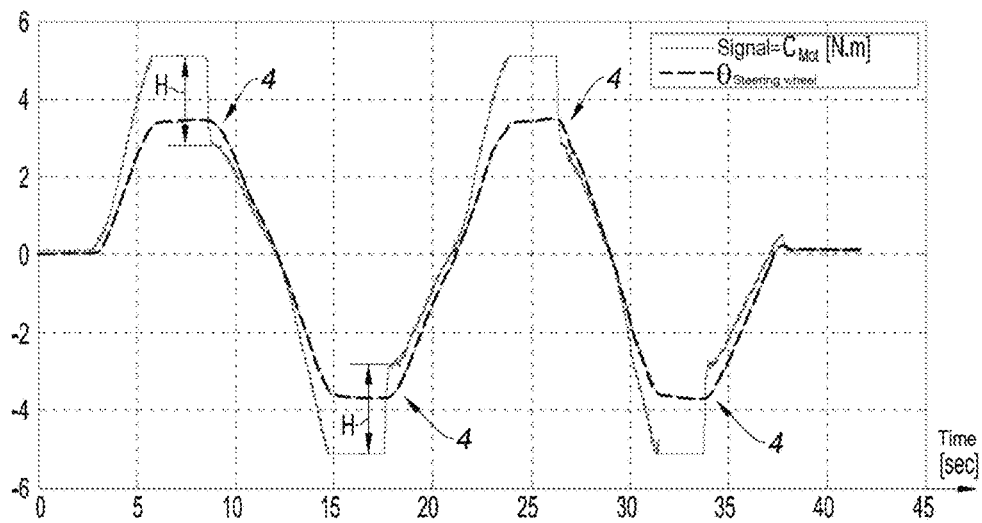

In the example where the method is applied to the detection of the steering reversals 4, said successive steering reversals 4 are clearly visible in FIG. 1, in which the dotted line curve illustrates the evolution over time of the angular position $\theta_{steering\ wheel}$ of the steering wheel, thus making the alternations of the direction of rotation of said steering wheel appear, when the driver successively steers the steering wheel to the right, then to the left, then to the right again, etc. (which explains that the curve representative of the angular position of the steering wheel has herein a shape similar to a sinusoid).

It will be noted that, in the preferred example of FIG. 1, the angular position $\theta_{steering\ wheel}$ of the steering wheel, representative of the configuration of the steering angle, is actually expressed in a equivalent manner from the angular position of the shaft 5 of the assist motor 2.

Indeed, any measurement of position representative of the spatial configuration of the steering angle, and consequently the angular position of the steering wheel, may be suitable for purposes of illustration and characterization of the steering reversals.

In this case, the mechanical reduction ratio of the kinematic linkage which connects the shaft 5 of the assist motor to the steering wheel establishes a relationship between the angular position of the shaft of the assist motor and the angular position of the steering wheel.

In the example in FIG. 1, the reduction ratio being in the range of 26, and the angle scale put on the ordinate corresponding to mechanical drive shaft kilo-degrees ($10^3$ degrees), the back and forth movement of the drive shaft alternates between about $-3600°$ degrees (drive shaft angle) and $+3600°$ degrees (drive shaft angle) which corresponds to the angular displacements of the steering wheel by about $+/-139$ degrees.

It will be also noted that, in a known per se manner, the angular position information of the shaft 5 of the assist motor 2 may be provided by a relative position sensor, of the «resolver» type, herein advantageously integrated in series with the assist motor 2.

This measurement choice of the angular position, a choice which is not restrictive relative to the principle of the invention explains that it is possible if required, to initially express said angular position in a «electric degree» type unit which takes into account the number of stator poles of the resolver, rather than in «mechanical degrees».

Preferably, the noisy signal Signal which is the object of the processing according to the invention is constituted by a signal called « motor torque signal » which is representative of the assistance force $C_{assist}$ which is output by the steering assist motor 2 (and more particularly which is representative of the torque, in this case the electromagnetic torque provided by said assist motor).

As such, the noisy signal Signal used for step (a) for detecting the transitions 4' is preferably constituted by the force or torque setpoint $C_{Mot}$ which is applied to the assist motor 2, or even by a measured value of the force or torque $C_{assist}$ which is actually output by the assist motor 2.

In practice, in the life situations considered for the vehicle, the value of the setpoint $C_{Mot}$ applied to the assist motor 2, and the value of the assistance force $C_{assist}$ which is actually provided by said assist motor 2, are extremely close, or even equal, so that these two signals may be used equivalently within the framework of the invention.

That is why, preferably, and for convenience of description, it is possible to assimilate, in the following, the noisy signal Signal to the «motor torque signal» and more particularly to the force setpoint (torque setpoint) $C_{Mot}$ applied to the assist motor 2.

Advantageously, applying the method according to the invention to a noisy signal which is representative of the assistance force $C_{assist}$ provided by the assist motor 2 enables detecting, in said noisy signal, transitions 4' which correspond to drops (in absolute value) of the assistance force, and more particularly to drops (of height H in FIGS. 1 and 3) which are the result of the reversal of the inner frictions which occurs during the steering reversals 4.

Indeed, any steering reversal 4 causes a switching (a reversal) of the displacement direction of the steering members.

Now, in practice, the resistant forces due to the inner frictions in the steering mechanism, which tend to oppose the steering maneuver, are of sign opposite to the sign of the displacement (and more particularly opposite to the sign of the speed of displacement) of the steering members.

The assistance force has, for its part, a driving function in fine, that is to say, that said assistance force tends to drive in displacement the steering members in the considered steering direction, desired by the driver, against the resistant forces, including the forces due to the inner frictions.

In any case, switching the steering angle maneuver direction, and consequently switching the displacement direction of the steering members, causes, almost simultaneously, on the one hand, making a first resistant force component disappear, that is attributable to the frictions which oppose, before the steering reversal, the displacement of the steering members in the first direction (by convention, to the left), and on the other hand, making a new (second) resistant force component occur, also attributable to the frictions, but opposite in sign to the first resistant force component, which opposes this time, after the steering reversal, the displacement of the steering members in the second direction (to the right) opposite to the first direction.

Accordingly, the presence of frictions, and more particularly the fact that the action direction of the frictions reverses as the steering direction is reversed, results in a hysteresis phenomenon which manifests, when the steering direction reverses, as a drop (in absolute value) of the resistant force, and consequently as a drop of the assistance force which is output by the assist motor for countering (and overcoming) said resistant force.

Furthermore, it will be noted that the force setpoint $C_{Mot}$ and/or measurement of the assistance force $C_{assist}$ signals actually output by the motor have the advantage of being available and may be easily exploited within the power steering.

In particular, the force setpoint $C_{Mot}$ signal intended to be applied to the assist motor 2 is necessarily permanently known, since it systematically constitutes an output data from the application module of the assistance laws 3 of the power steering.

Exploiting this setpoint signal $C_{Mot}$ therefore requires only a very simple implementation.

The information relating to the measurement of the assistance force $C_{assist}$ (or the torque) actually output by the assist motor 2 may be, for its part, given, if required, by said assist motor 2 itself (or more particularly by the controller integrated to said motor), if said assist motor is equipped in series with a force sensor, and more particularly a suitable electromagnetic torque sensor.

The measurement of the assist force $C_{assist}$ may be, of course, alternatively, obtained by any other appropriate outer force (or torque) sensor, such as a torque sensor attached on the shaft 5 of the assist motor 2.

According to a possible variant of implementation of the method, it will be possible to consider as «motor torque signal» representative of the assistance force $C_{assist}$ output by the assist motor 2, the traction or compressive force exerted (longitudinally, along the axis of translation of said rack) on the steering rack.

Such a signal might be for example provided by the strain gauges measuring the deformations of the rack, or by any other appropriate force sensor.

Generally, for the (mere) detection of the transitions 4', herein the detection of the steering reversals according to the invention, it is indeed, possible to exploit as «noisy signal», any signal whose value is sensitive to the desired type of transition 4'.

Herein, it is then possible to use any signal sensitive to a reversal of the frictions, that is to say any signal whose value is affected by all or part of the (inner) frictions which are exerted on the steering system so that said signal undergoes a perceptible variation (herein a drop) during the steering reversal (and consequently during the reversal of said frictions).

Furthermore, it will be noted that, taking into account the driving ratio between the assist motor 2 and the steering rack, it is possible to indifferently express the motor torque signal $C_{Mot}$ in the form of a motor torque or a rack equivalent linear force without modifying the general principle of the invention.

Figure 2:
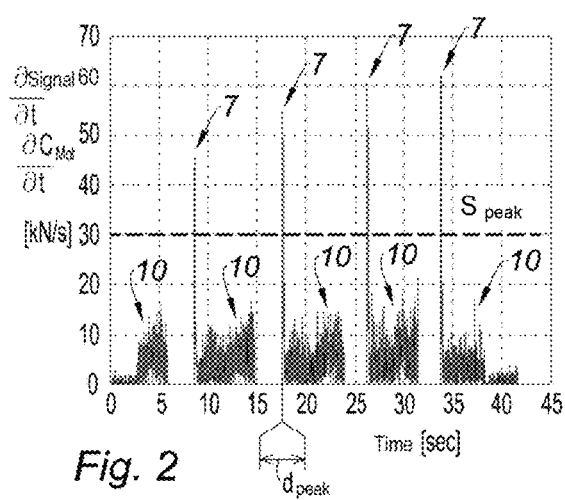
FIG. 2 illustrates, on a time diagram, the values taken by the time derivative of the noisy signal of FIG. 1.
Figure 3:
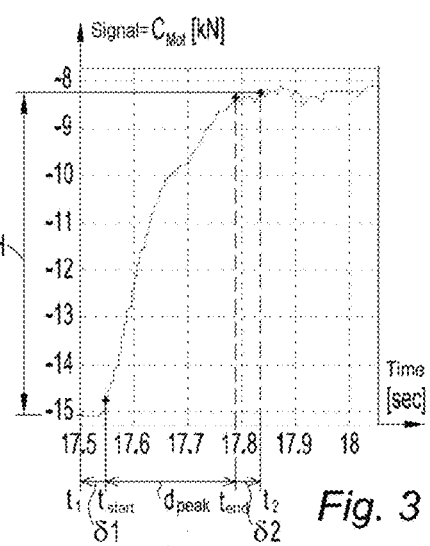
FIG. 3 illustrates, in a time diagram, an enlarged view of the curve representative of the noisy signal of FIG. 1, at the moment of a drop of torque (in absolute value) caused by a steering reversal.

Thus, by way of example, the motor torque signal $C_{Mot}$ of FIG. 1, which is homogeneous to a torque (expressed in N·m) in said FIG. 1, may thus be converted, for convenience and by mere convention of representation, in the form of an equivalent linear force, expressed in Newtons, and more exactly in kilo-Newtons, as it may be seen in FIG. 2 and FIG. 3.

Furthermore, although it is not excluded to work with analog signals Signal, $C_{Mot}$ ( . . . ), and in particular an analog motor torque signal $C_{Mot}$, one can preferably use one or more digital signals Signal, $C_{Mot}$ ( . . . ), and in particular a digital motor torque signal $C_{Mot}$, as far as the method in accordance with the invention is particularly well adapted for processing digital signals.

According to the invention, during step (a) for detecting transition 4', the noisy signal Signal, which is carrier of an information used for the management of the power steering (herein for example, an information concerning the evolution of the value of the motor torque, whose drop gives information about the occurrence of a steering reversal 4), is subjected to a derivation sub-step (a1), during which the time derivative $$\frac{\partial \text{Signal}}{\partial t}$$

of the noisy signal is evaluated (herein by means of the derivation module 6, in FIG. 4).

In practice, it is possible to apply, for this purpose, any derivation method allowing determining the variation of the noisy signal Signal per time unit (that is to say the slope of the curve representative of said signal), in this case between two instants separated by a predetermined, sufficiently limited time interval (sampling period).

For information, said sampling period (also called «sampling interval») might be comprised between 0.5 ms and 10 ms.

According to the invention, during transition detection step (a), and after having evaluated the time derivative of the noisy signal during the derivation sub-step (a1), the noisy signal is subjected to a selective filtering sub-step (a2), herein achieved in a filtering module 8, 9, during which the time derivative $$\frac{\partial \text{Signal}}{\partial t}$$

of the noisy signal is compared to a predetermined peak variation threshold $S_{peak}$ in order to detect the appearance of a derivative peak 7, greater than said peak variation threshold $S_{peak}$.

Such a derivative peak 7, greater than said predetermined variation threshold, indicates indeed a transition 4' corresponding to a rapid variation (or even to an almost discontinuity) of the noisy signal, and more particularly to a drop (the value becoming closer to zero), in absolute value, of said noisy signal Signal.

In the aforementioned preferred application example, such a derivative peak 7 can therefore indicate a reversal of the steering angle 4 direction.

As said hereinabove, and as clearly shown in FIG. 1, the transition 4', herein due to a steering reversal 4, manifests, due to the fact of the concomitant reversal of the frictions, as a variation, in this case a drop, of the noisy signal Signal (motor torque signal $C_{Mot}$).

The drop of the noisy signal has a relatively significant height H (in the range of 2.5 N·m of motor torque in the example of FIG. 1) and a relatively short duration (typically lower than half a second, and for example comprised between 100 ms and 300 ms).

Said drop is therefore distinguishable by an steep slope setback of the noisy signal, herein the motor torque signal $C_{Mot}$, as it is clearly visible in FIG. 1, and thus manifests as a significant and sudden increase of the value of the time derivative $$\frac{\partial \text{Signal}}{\partial t}$$

of said noisy signal, or more particularly herein, of the value of the time derivative of the motor torque signal $$\frac{\partial C_{Mot}}{\partial t},$$

in the form of a derivative peak 7 as illustrated in FIG. 2.

The inventors have thus found that the transitions 4', and more particularly the steering reversals 4, are indicated by derivative peaks 7, which may be identified since they have a value greater than a slope threshold value, called «threshold variation» $S_{peak}$, that is to say that said peaks 7 satisfy:

$$\frac{\partial \text{Signal}}{\partial t} \geq S_{peak}$$

and therefore, more particularly:

$$\frac{\partial \text{Signal}}{\partial t} = \frac{\partial C_{Mot}}{\partial t} \geq S_{peak}$$

Typically, in particular in the considered example in FIG. 2, the peaks 7 of the time derivative of the motor torque signal (or, more particularly, the peaks of the time derivative of the equivalent force exerted on the rack) that are characteristic of a steering reversal 4 were comprised in a range called «peak range» greater than 30 kN/s, and for instance ranging from 30 kN/s to 65 kN/s, and more particularly from 35 kN/s to 50 kN/s.

The predetermined variation threshold $S_{peak}$ may be then selected as lower than or equal to the expected peak range, and in particular equal or close to the lower threshold of said range. For example, the peak variation threshold $S_{peak}$ may be herein set at 30 kN/s.

During the selective filtering sub-step (a2), one also evaluates the holding duration ($d_{peak}$) of the derivative peak 7, during which the time derivative $$\frac{\partial \text{Signal}}{\partial t}$$

of the noisy signal is held above said variation threshold ($S_{peak}$), and checks whether said peak holding duration ($d_{peak}$) reaches or exceeds a predetermined minimum duration threshold ($d_0$).

Advantageously, this second condition (of duration) set by the selective filtering constitutes an additional precaution in the identification of the transitions 4' which are truly representative of a behavioral phenomenon of the steering, of the driver or the vehicle, and in particular in the identification of the steering reversals 4, insofar as said selective filtering enables distinguishing between, on the one hand, the derivative peaks 7 which actually correspond to the transitions 4' which affect the monitored value (herein the amplitude) of the noisy signal, and on the other hand, the noise derivative peaks 10 (FIG. 2) which are caused by the background noise which disturbs the noisy signal (herein the motor torque signal $C_{Mot}$).

Indeed, since the noise creates random and rapid fluctuations within the noisy signal Signal, it is not excluded that, occasionally, said noise causes in said signal the appearance of a variation (slope) which would be greater than the variation threshold $S_{peak}$, and which might be misinterpreted, as a transition 4' (a steering reversal 4), on the sole basis of the first detection criterion by calculating the time derivative.

However, the inventors found that the noise, a substantially periodic phenomenon, had a characteristic half-period which is strictly lower than the drop time of the noisy signal itself, and more particularly lower than the dropt time of the motor torque signal.

The duration of the noise derivative peak 10, caused by the noise, being substantially equal to the half-period of said noise (half-period during which the noise monotonically increases, or conversely monotonically decreases, between the minimum and the maximum of the concerned oscillation, or vice versa), so it is possible to isolate the relevant derivative peaks 7 representative of a transition 4' (actual steering reversal), by excluding, according to a second criterion complementing the first criterion, the derivative peaks (of noise 10) which have a duration strictly lower than the characteristic duration of the expected transition (herein the duration of a steering reversal 4).

Preferably, the minimum duration threshold $d_0$ is selected as equal to or greater than the maximum half-period characteristic of the noise affecting the noisy signal Signal.

Said maximum characteristic half-period (expected) of the noise might in particular be estimated from simulations or test campaigns.

Preferably, and preferably in a cumulative manner with the choice of sizing provided hereinabove, the minimum duration threshold $d_0$ might be selected as strictly lower than the duration characteristic of the transitions 4' to be detected.

This characteristic time (expected) of the transitions 4' might also be estimated from simulations or test campaigns By way of example, in particular well adapted for the detection of steering reversals, it may be possible to set the minimum duration threshold $d_0$ at a value comprised between 30 ms and 40 ms (while the duration characteristic of the transition, and more particularly of the drop caused by a steering reversal, is equal to or greater than 100 ms).

Concretely, the filtering module 8, 9 may include a peak detection latch, placed under the double dependence, on the one hand, of the comparison module 8 that achieves comparing the time derivative to the variation threshold $S_{peak}$, and on the other hand, on a clock that measures the time elapsed from the instant when said comparison module 8 has detected the crossing of the variation threshold $S_{peak}$, such that said latch returns a detection signal (peak identification signal) as soon as the two cumulative conditions are combined to confirm that there is a steering reversal peak 7 due to a transition 4' (herein a steering reversal 4).

In a preferred variant of the invention, the transition detection step (a) is followed by a transition characterization step (b) during which a peak start instant $d_{start}$ is identified, which corresponds to the instant at which the time derivative $$\frac{\partial \text{Signal}}{\partial t}$$

of the noisy signal passes above the peak variation threshold $S_{peak}$, and a peak end instant $t_{end}$ is identified, which corresponds to the instant at which the time derivative $$\frac{\partial \text{Signal}}{\partial t}$$

of the noisy signal descends back below said variation threshold $S_{peak}$.

Advantageously, it is thus possible, when a transition 4' is detected (and validated as such) to precisely characterize the time situation (timestamp) of the transition 4' and the time extent (duration) of said transition 4'.

The transition 4', and more particularly the instants forming the bounds of the time interval over which said transition 4' extends, may then serve as time marker points, in particular to evaluate what were the values taken by a signal (for example the noisy signal, or any other useful signal) right before and right after said transition 4', which allows exactly knowing the status in which the steering (and/or the vehicle) was before and after said transition 4' and thus quantifying the changes occurring during this transition.

In order to temporarily frame the transition 4', it might be possible to select, as instants of observation of the status of the steering (or the vehicle), a first reference instant t1 which is equal to or prior to the peak start time $t_{start}$ and a second reference instant t2 which is equal to or subsequent to the peak end time $t_{end}$.

As detailed hereinafter, a possible widening of the time interval [t1, t2] defined by the first and second reference instants, with respect to the identified peak start and peak end interval [$t_{start}$, $t_{end}$], ensures that the complete transition 4' is well considered, without truncating said transition, and that the evaluation of the statuses of the steering system (and/or the vehicle) observed on either side of said transition, to the first and second reference instants t1, t2, is not distorted.

Of course, the method in accordance with the invention will preferably use a database that makes it possible storing in a memory the history of the different values successively taken by the signal (or the signals) used by said method, over a record period which will be selected greater than the expected duration of the transitions 4'.

Thus, it might be possible, after that a derivative peak 7 has been identified, to go back over the history of the studied signal so as to know the one (or more) value(s) taken by said signal at an instant (typically the first reference instant t1) which precedes the occurrence of said derivative peak and/or at an instant (typically the second reference instant t2) which follows said derivative peak 7.

Advantageously, in order to avoid unnecessary consumption of the memory space, the database will be constantly refreshed, over a rolling record period, so as to keep, at a considered instant, only the information which may actually be useful for recovering the past values of the signal which are relevant to perform the calculation of the power steering management at said considered instant.

For information, the record period might be comprised between 0.5 s (500 ms) and 1 s, and preferably equal to 500 ms.

Furthermore, according to a preferred possibility of implementation which allows estimating the (inner) frictions which prevails in the steering, the method according to the invention may comprise a friction evaluation step (d) during which a signal $C_{action}$, called «actuation force signal», which is representative of the total actuation force (and more particularly of the torque) jointly exerted on the power steering by the driver and by the assist motor 2 is acquired, and the friction force F which opposes the steering movements of the power steering, is evaluated, by means of a friction evaluation module 11, from the difference $\Delta C_{action}$ between two values taken by said actuation force signal $C_{action}$ respectively before and after the steering reversal 4.

In other words, the method comprises a friction evaluation step (d) during which the friction is evaluated from the drop $\Delta C_{action}$ of the actuation force signal $C_{action}$ which occurs during the steering reversal detected by the step (a).

Indeed, for the same reasons as that detailed hereinabove in order to explain the drop H of the motor torque signal $C_{Mot}$ in case of steering reversal, a steering reversal 4 also results, more generally, in a drop $\Delta C_{action}$ of the actuation force signal $C_{action}$, due to the reversal of the sign of the friction forces.

In absolute terms, it might be furthermore possible, in a substantially equivalent manner, and without altering the principle of the invention, to evaluate the friction F from the motor torque signal $C_{Mot}$ alone (as it is provided by the setpoint applied to the motor, or by the electromagnetic torque output by the motor, as mentioned hereinabove), and more particularly from the difference between two values taken by said motor torque signal $C_{Mot}$ alone (rather than by the total actuation force signal $C_{action}$), respectively before and after the steering reversal, that is to say from the aforementioned height of drop H.

However, in order to obtain a more accurate and more complete evaluation of the friction phenomenon which affects the steering system, it is preferable to use, for calculating the height of drop, a signal which encompasses the friction effects on a kinematic linkage which is as long and as complete as possible, within the steering system, and this, in order to take into account the greatest possible number of segments of the steering system in which the frictions may arise and then to neglect the least possible inner friction sources.

In other words, it is preferred to collect signals of forces in areas that are located as far upstream as possible of each kinematic linkage comprised between an upstream actuator element of the steering system (namely the driver and the assist motor respectively), on the one hand and the downstream effecting members (rods and steered wheels) on the other hand, so that these signals encompass the maximum of frictions which oppose the maneuver of the steering system, and for instance encompass all the frictions which arise throughout the kinematic linkage located downstream of the one or more concerned actuator(s).

Furthermore, it is also preferable to consider a total actuation force signal, which takes into account not only the contribution of the assist motor 2, but also the manual contribution of the driver.

Indeed, the drop (in absolute value) of such an actuation force signal is thus representative of the frictions which affect the steering mechanism in both its "motorized" portion (assist motor, reducer, rack . . . ) as well as in (or all part of) its "manual" portion, also called "driver" portion (steering wheel, steering column, pinion/rack connection . . . )

For these reasons, the actuation force signal $C_{action}$ is preferably formed, as illustrated in FIG. 4, by the sum, on the one hand, of a steering wheel torque signal representative of the steering wheel torque $C_{steering\ wheel}$ exerted by the driver on the steering wheel, and on the other hand, of the motor torque signal $C_{Mot}$.

Advantageously, it will be noted that the steering wheel torque $C_{steering\ wheel}$ and motor torque $C_{Mot}$ signals are already available at any instant within the most of power steering systems, and may be thereby easily exploited, which makes the implementation of the invention simpler.

The steering wheel torque signal $C_{Mot}$ might for example correspond to a measurement of the steering wheel torque $C_{steering\ wheel}$ obtained by an appropriate steering wheel torque sensor, such as a magnetic torque sensor measuring the elastic deformations of a torsion bar positioned between the steering wheel and the steering column.

Such a steering wheel torque signal $C_{Mot}$ will advantageously allow taking into consideration all frictions appearing downstream of said torsion bar, and in particular the frictions arising in the connection between the rack and the pinion that is fastened to the lower segment of the steering column.

The motor torque signal $C_{Mot}$ adapted for this application might, for its part, be obtained by any appropriate means described hereinabove.

As such, it will be noted that when the motor torque signal $C_{Mot}$ is intended to quantify the height of drop (during the friction evaluation step (d)), and not only to detect the steering reversals (during the detection step (a)), and this, irrespective of the fact that said motor torque signal $C_{Mot}$ is used alone or in combination with the steering wheel torque signal to form the total actuation force signal $C_{action}$, said motor torque signal $C_{Mot}$ will be preferably collected as far upstream as possible relative to the assist motor 2, and will therefore preferably consist of the setpoint applied to said assist motor, or of the measurement the electromagnetic torque which is output by said assist motor, as it has been said hereinabove.

In order to evaluate the friction F, one preferably determines what was the value $C_{action}(t1)$, called «actuation force value prior to the steering reversal», that was taken by the actuation force signal at a first reference instant t1 which is equal to or prior to the peak start instant $t_{start}$, one determines what was the value $C_{action}(t2)$, called «actuation force value subsequent to the steering reversal», that was taken by the actuation force signal at a second reference instant t2 which is equal to or subsequent to the peak end instant $t_{end}$, then on evaluates the friction from calculating the difference between the actuation force value subsequent to the steering reversal $C_{action}(t2)$ and the actuation force value prior to the steering reversal $C_{action}(t1)$, that is to say:

$$\Delta C_{action} = |C_{action}(t2) - C_{action}(t1)|.$$

More particularly, it might be considered that the value of the friction forces F which affect the maneuver of the steering at the considered instant (that is to say, at the moment of the considered steering reversal 4) is equal, taking into account the hysteresis phenomenon mentioned hereinabove, to the half-difference between the actuation force value subsequent to the steering reversal and the actuation force value prior to the steering reversal, that is to say: $F = \Delta C_{action}/2$.

Advantageously, using a time derivative of the appropriate noisy signal Signal (herein the motor torque signal $C_{Mot}$) as well as a time reference referring to the derivative peak 7 start $t_{start}$ and end $t_{end}$ instants which are identified from said derivative makes it possible to detect exactly the moment when the steering reversal 4 occurs, and thus to improve the reliability and the accuracy of the evaluation of the features of the drop of the actuation force signal.

By measuring the actuation force at reference instants t1, t2 which are calculated from the peak start and end instants and which frame as close as possible the actual steering reversal 4 (and then the drop of the actuation force signal), the invention allows exactly determining what was the exact value of the actuation force $C_{action}$ right before and right after said steering reversal.

Any delay or approximation in the measurement, which might otherwise lead to consider a value of the actuation signal which is not representative of the actual height of drop, since said value is measured at a measurement point temporally too far from said drop, is thus avoided.

The invention thus allows evaluating the friction F in a reactive and reliable manner, since said invention considerably reduces the sources of errors and delays, which marred so far the friction estimation methods based on a monitoring of the angular position of the steering wheel.

According to one possibility of implementation, which may be applied besides regardless of the use of the reference instants t1, t2, it might be possible to arbitrarily choose to match the first reference instant t1 match with the peak start time $t_{start}$ (that is to say to set $t1=t_{start}$), and/or, complementarily or alternatively, to choose to match the second reference instant t2 with the peak end time $t_{end}$ (that is to say, to set $t2=t_{end}$).

However, according a second possibility, the first reference instant t1 is preferably selected strictly prior to the peak start time $t_{start}$ ($t1<t_{start}$), said first reference instant preceding said peak start time by an advance value δ1 (that is to say: $t1=t_{start}-δ1$) and/or the second reference instant t2 is selected strictly subsequent to the peak end instant ($t2>t_{end}$), said second reference instant following said peak end time by a delay value δ2 (that is to say: $t2=t_{end}+δ2$).

For information, the advance value δ1 is preferably comprised between ms and 100 ms, and for example substantially equal to 50 ms (fifty milliseconds).

For information, the delay value δ2 is preferably comprised between 20 ms and 100 ms, and for example substantially equal to 50 ms (fifty milliseconds).

In other words, the time interval [t1; t2] is preferably widened, and this, preferably on both sides, both in delay as well as in advance, in particular when said interval is the interval on which the height of drop $ΔC_{action}$ of the considered signal is calculated (herein the actuation force signal).

This widening of the measurement interval with respect to the gross interval defined by the peak start and end instants, wherein said widening preferably represents at least 10 ms (in advance as well as in delay), and for preferential example 50 ms (in advance as well as in delay: $δ1=δ2=50$ ms), allows ensuring that the elapsed duration (that is to say, t2−t1) between the first reference instant t1 and the second reference instant t2 is actually greater than or equal to (and, if appropriate right greater than) the actual duration of the (complete) drop of the signal corresponding to the transition 4'.

When applied to the evaluation of the friction, this allows ensuring that the entire duration of the drop of the signal which is attributable to the steering reversal 4, and thus to the friction, is covered.

Thus, the method in accordance with the invention allows guaranteeing that the extreme values of the actuation force signal which correspond to the entire height of drop of said signal, characteristic of the steering reversal, are well measured without truncating a part of said drop.

Furthermore, the advance δ1 and delay δ2 values remain, however, relatively lower than the predetermined maximum widening thresholds, selected such that the first reference instant t1 and the second reference instant t2 remain in the immediate temporal vicinity of the transition domain (vicinity of the domain of the drop), in "border" domains of the transition, border domains in which the value of the concerned signal remains almost constant with respect to the value which is taken by said signal at the transition limit (the evolutions of said value in the border domains being for example contained in an amplitude range lower than or equal to 10%, to 5%, or even lower than or equal to 1% of the height of drop).

Herein, due to the fact that, outside the domain of the drop attributable to the reversal of the friction, the motor torque signal $C_{Mot}$, as well as the actuation force signal $C_{action}$, vary much more slowly than during said drop, the low widening provided (the advance δ1 and the delay δ2 being typically lower than 200 ms or even 100 ms, and preferably each equal to 50 ms) allows holding the first reference instant t1 and the second reference instant t2 in the immediate temporal vicinity of the domain of the drop, in "border" domains of said drop, border domains in which the value of the concerned signal remains almost constant with respect to the value which is taken by said signal at the drop limit.

Thus, the measurements of the signal values taken at the first reference instant t1 and the second t2 reference instant, that is to say neither too early nor too late with respect to the drop attributable to the friction, accurately reflect the actual value of the actuation force $C_{action}$ (or respectively of the motor torque $C_{Mot}$) considered at the limits of said drop.

Ultimately, the method according to the invention then allows substantially measuring a height of drop which corresponds to the entire contribution specific to the friction and nothing but the contribution specific to the friction.

Therefore, said method advantageously enables obtaining, almost in real-time, a reliable, accurate, and regularly updated measurement of the actual friction F which affects the steering system at the concerned instant, whereas the known methods, which were based on a quite coarse approximation of the friction, made from pre-established theoretical models of friction, were not able to do so.

It will be noted that, according to a variant of implementation of the invention, it might be possible, instead of calculating the first and the second reference instants t1, t2 respectively from the peak start instant $t_{start}$ and the peak end instant $t_{end}$, to characterize the derivative peak 7 by a single peak instant, corresponding for example to the peak start instant, or the peak end instant, or the average instant located in the middle of said peak start and end instants, and then to arbitrarily set the first and second reference instants t1, t2 on either side of said single peak instant, so as to encompass in the interval thus defined the expected characteristic duration of the drops of signal; for example, it might be possible to consider that the first reference instant is located 100 ms before the single peak instant, and the second instant 200 ms after said single peak instant.

Of course, this choice of reference instants t1, t2 does not affect the general principle of evaluation of the friction described hereinabove.

Regardless of the definition used for the first and the second reference instants t1, t2, the record period of the actuation force $C_{action}$ (and/or the motor torque signal $C_{Mot}$) which allows temporarily keeping in memory the values of said signal which are useful for the management of the steering, and more particularly for the evaluation of the friction at the considered instant, will be, of course, greater than the width of the time interval [t1; t2] comprised between said first and second reference instants, and, more particularly, greater than the expected maximum duration of drop increased by the delay δ2 and the advance δ1.

Furthermore, the variation threshold $S_{peak}$ and/or, if appropriate, the peak holding minimum duration threshold $d_0$ of and/or the advance δ1 and delay δ2 values are preferably adjusted depending on the angular acceleration $\ddot{θ}_{steering\ wheel}$ of the steering wheel.

In other words, the invention allows dynamically updating the setting used for detecting the steering reversals and/or the evaluation of the friction, depending on different parameters such as the angular acceleration $\ddot{θ}_{steering\ wheel}$ of the steering wheel, and this, in order to optimize in each case the reliability and the reactivity of the method.

Indeed, it will be easily understood, for example, that the duration of drop of the motor torque signal $C_{Mot}$ (respectively of the actuation force signal $C_{action}$) is as far shorter, and the slope thereof (the time derivative thereof) as far higher as the maneuver of the steering wheel is faster.

Thus, for example, when the driver quickly executes a steering maneuver immediately followed by a countersteering maneuver, such that relatively high angular accelerations of the steering wheel apply on both sides of the zero speed point that corresponds to the steering reversal, it is possible to increase the value of the variation threshold $S_{peak}$, in order to better remove the noise, while keeping the possibility of detecting a drop having a steep slope.

Alternatively or complementarily, it is also possible or even desirable, when the angular acceleration of the steering wheel increases, to reduce the peak holding minimum duration threshold $d_0$, in order not to risk excluding a peak which would be relatively short but nevertheless representative of a steering reversal.

Similarly, alternatively or complementarily, it is also possible to consider reducing, in this situation, the advance $\delta 1$ and/or delay $\delta 2$ values used to define the first and second reference instants t1, t2, at which the extreme values of the actuation force $C_{action}$ allowing estimating the height of drop are acquired.

Indeed, since the drop duration becomes shorter when maneuvering the steering wheel is faster, it is possible to frame the whole of the drop in a narrower time domain without risking truncating the height of drop.

Advantageously, reducing the peak holding minimum duration threshold $d_0$ and/or the advance value $\delta 1$ and/or delay value $\delta 2$ enables accelerating the execution of the method, and thus optimizing the reactivity thereof without affecting the reliability thereof.

More generally, adapting, in real time, the detection of the transitions 4' and/or the evaluation of the friction depending on the life situation of the vehicle and/or the dynamic of the steering wheel allows optimizing the performances of the method, and making the latter especially versatile.

Furthermore, the method according to the invention preferably comprises a verification step (c), during which there is verified, preferably cumulatively, herein within a verification module 12 in FIG. 4, the realization of one or more condition(s) of implementation among the following conditions: the speed of rotation of the steering wheel $\dot{\theta}_{steering\ wheel}$ is lower than or equal to a predetermined steering wheel speed threshold $\dot{\theta}_{threshold\ steering}$ wheel, the angular acceleration of the steering wheel $\ddot{\theta}_{steering\ wheel}$ is lower than or equal to a predetermined steering wheel acceleration threshold $\ddot{\theta}_{threshold\ steering\ wheel}$, the evolution of the yaw rate $\dot{\psi}$ of the vehicle or the lateral acceleration $\gamma$ of the vehicle as a function of the orientation angle of the steering wheel $\theta_{steering\ wheel}$ is located in a substantially linear domain.

The condition dealing with the speed of rotation of the steering wheel $\dot{\theta}_{steering\ wheel}$, which must be lower than or equal to a steering wheel speed threshold $\dot{\theta}_{threshold\ steering}$ wheel close to zero, and for example in the range of 5 deg/s, allows verifying that the life situation of the vehicle is compatible with a steering reversal, by ensuring that the angular speed of the steering wheel is located in the vicinity of zero at the moment of the presumed steering reversal.

Indeed, during an actual steering reversal, the steering wheel speed becomes necessarily zero at the reversal point (cusp) of the steering wheel. Conversely, the absence of crossing zero of the speed of the steering wheel excludes the situation of steering reversal.

The condition dealing with the angular acceleration of the steering wheel allows, for its part, conducting the evaluation of the friction only when the acceleration of the steering wheel, and thus the acceleration of the movements of the members of the steering mechanism is low, for example lower than or equal to 100 deg/s$^2$, that is to say only when the inertial forces are non-existent or negligible.

Thus, we ensure that, during the evaluation of the friction, the stress state of the steering mechanism, such that this stress state is perceived and quantified by measuring the motor torque $C_{Mot}$ and/or by measuring the actuation force $C_{action}$, is well representative of the friction phenomenon, and only the friction phenomenon, and is not distorted by the appearance of inertial forces.

The condition on the linearity of the evolution of the yaw rate $\dot{\psi}$ of the vehicle, or, equivalently, of the evolution of the lateral acceleration $\gamma$ of the vehicle, depending on the orientation angle of the steering wheel $\theta_{steering\ wheel}$, that is to say dealing with the linearity of the lateral dynamic of the vehicle, consists in ensuring that the vehicle is not in a loss of adhesion situation, and more particularly either in an oversteering situation or an understeering situation.

Indeed, a loss of adhesion (loss of tires grip on the pavement) will cause a drop in the resistant force that the wheels and the tie rods exert on the rack, against the assist motor, which will consequently result in a corresponding decrease of the force output by the assist motor, wherein said decrease has no connection with the action of the inner frictions F, and thus might distort the evaluation of those frictions F.

In order to check the condition of linearity, it might be possible in particular, to use the empirical laws established during test campaigns and associating a corresponding maximum permissible yaw rate or a corresponding maximum permissible acceleration, in different life situations (dry weather, wet pavement, etc.), with each angular position of the steering wheel among a plurality of different predetermined angular positions of the steering wheel.

Accordingly, one can consider being in the linearity domain, that is to say in a life situation allowing a reliable evaluation of the friction, if, in the angular position of the steering wheel (or, equivalently, the angular position of the shaft of the assist motor) measured at the considered instant, the yaw rate k or the lateral acceleration $\gamma$ of the vehicle (which may be for example provided by the electronic stability control system ESP, or by the braking assistance system Anti-lock Braking System), is lower than the maximum permissible value.

Such a redundancy of verifications allows excluding doubtful cases, and thus keeping only the reliable evaluations of the frictions, which significantly improves the robustness of the method in accordance with the invention in view of the different instabilities which might affect it.

Of course, the invention also concerns as such a filter 6, 8, 9 (shown in dotted lines in FIG. 4) allowing implementing a method according to the invention.

The features and advantages of said filter may be deduced mutatis mutandis from the description of the method.

Thus, the invention also concerns a filter for detecting transitions within a noisy signal, said filter 6, 8, 9 comprising a derivation module 6 which is structured to collect the noisy signal Signal and to evaluate the time derivative $$\frac{\partial \text{Signal}}{\partial t}$$

thereof as well as a selective filtering module 8, 9 which is structured on the one hand, for comparing said time derivative of the noisy signal to a predetermined variation threshold $S_{peak}$, in order to detect the occurrence of a derivative peak 7, greater than said variation threshold $S_{peak}$, and on the other hand, for evaluating the holding duration $d_{peak}$ of said peak, during which the time derivative $$\frac{\partial \text{Signal}}{\partial t}$$

of the noisy signal is held above said variation threshold $S_{peak}$, after having crossed said variation threshold $S_{peak}$, and for checking whether said peak holding duration reaches or exceeds a predetermined minimum duration threshold $d_0$.

Preferably, the minimum duration threshold $d_0$ is selected to be equal or greater than the maximum half-period characteristic of the noise affecting the noisy signal.

Preferably, the minimum duration threshold $d_0$ is selected to be strictly lower than the duration characteristic of the transitions 4' to be detected.

Preferably, the minimum duration threshold $d_0$ is comprised between 30 ms and 40 ms.

Furthermore, each of the aforementioned modules, namely each of modules for applying the control laws 3, derivation 6, selective filtering 8, 9, friction evaluation 11, checking 12 might be formed by an electronic circuit, an electronic board, a calculator (computer), a programmable controller, or any other equivalent device.

Each of the aforementioned modules may have a physical control structure, based on the connection arrangement of its electronic components, and/or, preferably, a virtual control structure defined by computer programming.

Said modules may be totally or partially grouped, as appropriate within a same casing, so as to form a power steering management module.

Of course, the invention also concerns as such any data medium readable by a computer and containing computer program code elements allowing executing the method in accordance with the invention when said medium is read by a computer.

Finally, it will be noted that the method in accordance with the invention, which exploits generally available signals within the power steering systems, may be easily generalized to all power steering systems, including in retrofitting many already existing power steering systems, by simply reprogramming the calculator thereof.

Of course, the invention is not limited to the variants described hereinabove, those skilled in the art being in particular, able to isolate or freely combine one with the other either of the aforementioned features, or even to substitute their equivalents.

Thus, the use of the filter 6, 8, 9, although preferably associated with the management of a power steering, may in particular be extended to any application for processing one or more management signals of a vehicle.

The invention claimed is:

1. A power steering management method comprising:
   obtaining a noisy signal from at least one sensor configured to measure a motor torque or a torque exerted by a driver on a steering wheel in a power steering system; and
   detecting transitions in the noisy signal, the noisy signal including information used for assisting a driver in maneuvering a power steering of the power steering system,
   wherein the detecting of a transition comprises:
      determining a time derivative of the noisy signal; and
      filtering the noisy signal to detect the transition, so as to generate a filtered signal including the information used for assisting the driver in maneuvering the power steering, and to exclude noise from the noisy signal,
   wherein the filtering comprises:
      comparing the time derivative of the noisy signal to a predetermined variation threshold in order to detect the appearance of a derivative peak greater than the variation threshold, the derivate peak being an indication of a reversal of a steering direction;
      determining a holding duration of the derivative peak, during which the time derivative of the noisy signal is held above the variation threshold; and
      determining whether the holding duration of the derivative peak is greater than or equal to a predetermined minimum duration threshold, so as to isolate the derivative peak of the transition to be detected from derivative peaks of the noise, which have a holding duration lower than the holding duration of the derivative peak of the transition to be detected,
   wherein the minimum duration threshold is selected to be greater than or equal to a maximum half-period characteristic of noise that affects the noisy signal, and less than a duration characteristic of the transition to be detected, and
   wherein a motor of the power steering system outputs an assistance force, which is based on the filtered noisy signal, so as to assist the driver in maneuvering the power steering.

2. The method according to claim 1, wherein the minimum duration threshold is between 30 ms and 40 ms.

3. The method according to claim 2, further comprising:
   after detecting the transition, characterizing the transition by identifying a peak start instant, which corresponds to an instant at which the time derivative of the noisy signal passes above the variation threshold, and identifying a peak end instant, which corresponds to an instant at which the time derivative of the noisy signal again descends below the variation threshold.

4. The method according to claim 3, wherein at least one of the variation threshold and the peak holding minimum duration threshold is adjusted based on an angular acceleration of the steering wheel.

5. The method according to claim 2, wherein at least one of the variation threshold and the peak holding minimum duration threshold is adjusted based on an angular acceleration of the steering wheel.

6. The method according to claim 1, further comprising:
   after detecting the transition, characterizing the transition by identifying a peak start instant, which corresponds to an instant at which the time derivative of the noisy signal passes above the variation threshold, and identifying a peak end instant, which corresponds to an instant at which the time derivative of the noisy signal again descends below the variation threshold.

7. The method according to claim 6, wherein at least one of the variation threshold and the peak holding minimum duration threshold is adjusted based on an angular acceleration of the steering wheel.

8. The method according to claim 1, wherein at least one of the variation threshold and the peak holding minimum duration threshold is adjusted based on an angular acceleration of the steering wheel.

9. A power steering system comprising:
a motor; and
a processor programmed to:
obtain a noisy signal from at least one sensor configured to measure a motor torque or a torque exerted by a driver on a steering wheel in a power steering system; and
detect transitions in the noisy signal, the noisy signal including information used for assisting a driver in maneuvering a power steering of the power steering system,
wherein detection of a transition comprises:
determining a time derivative of the noisy signal; and
filtering the noisy signal to detect the transition, so as to generate a filtered signal including the information used for assisting the driver in maneuvering the power steering, and to exclude noise from the noisy signal,
wherein the filtering comprises:
comparing the time derivative of the noisy signal to a predetermined variation threshold in order to detect the appearance of a derivative peak greater than the variation threshold, the derivate peak being an indication of a reversal of a steering direction;
determining a holding duration of the derivative peak, during which the time derivative of the noisy signal is held above the variation threshold; and
determining whether the holding duration of the derivative peak is greater than or equal to a predetermined minimum duration threshold, so as to isolate the derivative peak of the transition to be detected from derivative peaks of the noise, which have a holding duration lower than the holding duration of the derivative peak of the transition to be detected,
wherein the minimum duration threshold is selected to be greater than or equal to a maximum half-period characteristic of noise that affects the noisy signal, and less than a duration characteristic of the transition to be detected, and
wherein the motor outputs an assistance force, which is based on the filtered noisy signal, so as to assist the driver in maneuvering the power steering.

10. The filter according to claim 9, wherein the minimum duration threshold is between 30 ms and 40 ms.

* * * * *